March 26, 1929.　　　O. C. REEVES　　　1,706,964
WEIGHING SCALE POISE
Filed June 16, 1926
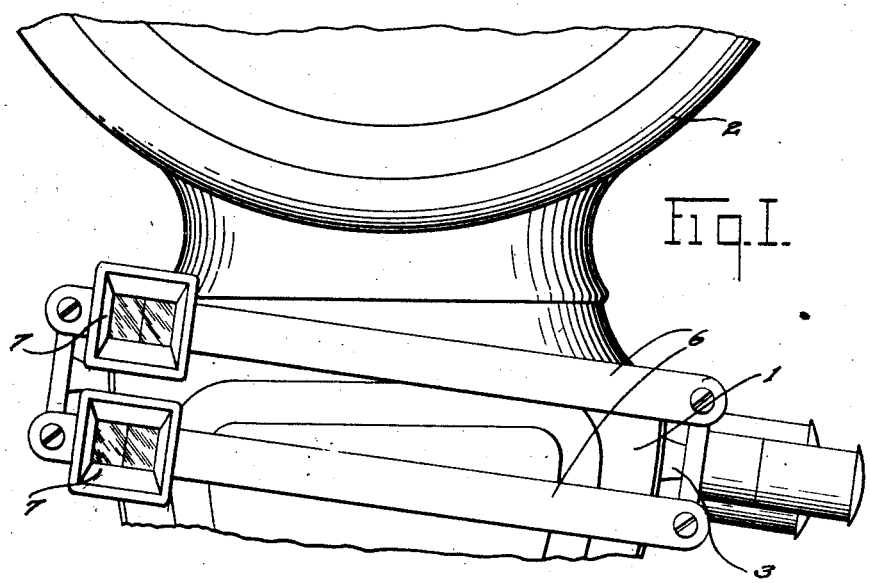
Fig.I.
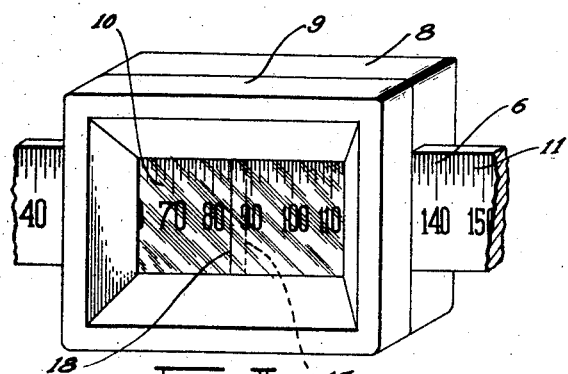
Fig.II.
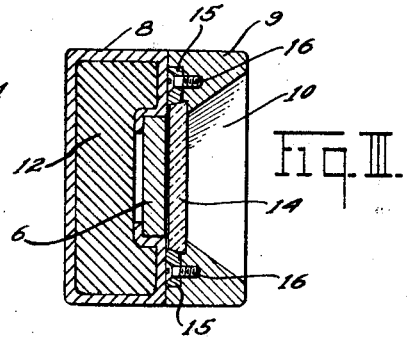
Fig.III.
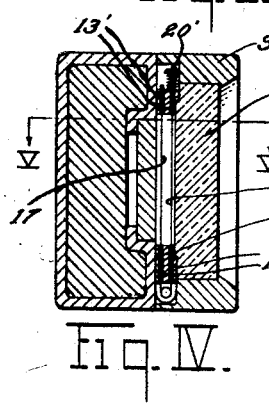
Fig.IV.
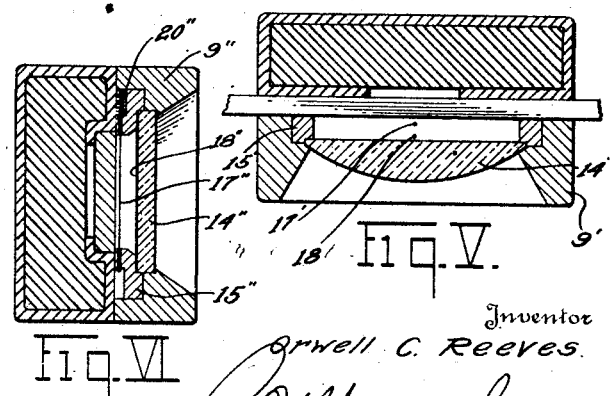
Fig.V. Fig.VI.
Inventor
Orwell C. Reeves.
By C. M. Marshall
Attorney Patented Mar. 26, 1929.

1,706,964

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

WEIGHING-SCALE POISE.

Application filed June 16, 1926. Serial No. 116,397.

This invention relates to indicating devices, and more particularly to indicating devices for weighing scale poises. The practice of weighing comparatively heavy loads of commodities has brought about the use of weighing scale beams carrying heavy poises, the slightest change of position of which corresponds to a considerable change of load, while the increasing values per unit of weight of the commodities make it especially desirable that the poises be accurately positioned upon the beam and their positions accurately noted. If, for example, the commodity to be weighed be placed upon the scale platform in a suitable container, the known weight of the container being 62 lbs., and in offsetting the weight of the container by means of a poise the latter be set at 61 lbs., the scale may indicate that the load is 425 lbs., when, in fact, the true weight is 424 lbs. Even when the beam is connected to an automatic load-counterbalancing mechanism of the most accurate type such errors will occur if the poise is not accurately positioned on the beam.

One of the principal objects of this invention is the provision of means whereby a poise may be easily and accurately positioned upon a scale beam in a minimum length of time.

Another object of the invention is the provision of an index and sighting means for a scale poise which will prevent errors caused by parallax, or the erroneous positioning of a poise by an operator who is not standing directly in front of the scale.

Still another object is the provision of a poise equipped with an index and sighting means operating in conjunction with a magnifying lense for the purpose of increasing the ease and accuracy with which the poise may be positioned upon a beam.

Other objects and advantages will be apparent from the following description, in which reference is had to the accompanying drawings illustrating preferred embodiments of my invention and wherein similar reference numerals designate similar parts throughout the several views.

In the drawings:—

Figure I is a fragmentary front elevational view of a portion of an automatic weighing scale showing beam and poise mechanism embodying my invention;

Figure II is an enlarged fragmentary isometric view of the poise of my invention;

Figure III is a transverse sectional view through the poise illustrated in Figure II;

Figure IV is a transverse sectional view through a poise showing a modified form of my invention;

Figure V is a horizontal sectional view through the poise taken substantially on the line V—V of Figure IV; and Figure VI is a transverse sectional view through a poise showing another form of the invention.

Referring to the drawings in detail, the frame of the scale illustrated in Figure I is shown as an upright column 1 erected upon a suitable base (not shown) which supports and houses the platform lever mechanism. The column 1 is surmounted by a watch-case-shaped casing 2 suitably supporting and enclosing automatic load-counterbalancing mechanism of any suitable type (not shown). A lever 3 fulcrumed within the column 1 is operatively connected to the platform lever and automatic load-counterbalancing mechanisms, the lever being provided with a pair of beams 6 equipped with poises 7. It is to be understood, however, that the device of my invention operates in exactly the same way in scales in which no automatic load-counterbalancing mechanism is employed.

The preferred form of the poise structure illustrated in Figures II and III consists of a rectangular body portion 8 and a frame 9, the latter having a comparatively large sight opening 10 through which the graduations 11 on the beam 6 are rendered easily visible to the operator, the body portion and frame being suitably held together by means of screws (not shown). The body 8 of the poise is preferably made in shell-like form and filled with lead 12 or other sealing material to the desired weight. The frame 9 is provided with a recess which receives a glass plate 14 held in place by means of a retaining plate 15 secured to the poise frame 9 by means of screws 16. The rear surface of the glass 14 in juxtaposition with the beam 6 is provided with a vertically extending index line 17, and the front surface of the glass is provided with a sighting line 18 so that an operator in setting the poise may, with ease, bring his eye into alignment with the index and sighting wires 17 and 18 and be assured that he is obtaining a correct reading of the position of the poise, as the errors of parallax attendant in setting a poise of the usual construction are not present. The lines upon the glass may be very minute grooves or hair line channels ground or otherwise etched thereon. When the eye of the observer is in the imaginary plane passing through the index and sighting lines, the lines apparently blend into a single reading index equivalent to the thickness of one line and the graduation on the beam in visual coincidence with the lines upon the poise glass represents the exact position of the poise. If the observer should move to a position in which his eye is not in the plane passing through the index and sighting wires, he is immediately apprised of the fact, as the lines 17 and 18 appear to separate, indicating that the operator is not in the proper position to accurately position the poise.

In the modified form of the poise shown in Figures IV and V the poise frame 9' is provided with a magnifying lens 14' in lieu of the plane surfaced window which is held in place by the supplemental frame 15'. The supplemental frame 15' is provided with a plurality of comparatively small guide openings 13' through which is stretched a wire, forming a reading and sighting index 17' and 18', answering the same purpose as the lines upon the glass 14. The wire is maintained in a state of tension by means of a contractile spring 20'. The incorporation of the lens 14' in a poise of this type is particularly advantageous as it causes the graduations upon the beam to be magnified and appear further apart, thus obviously making it easier to properly position the poise.

Another form of the poise is illustrated in Figure VI. The supplemental frame 15'' employed in retaining the lens or glass 14'' in the poise is provided with a pair of small openings through which is stretched an index wire 17'', the wire being held in a state of tension by means of a spring 20''. Sighting means is provided comprising a hair line etched upon the rear surface of the glass or lens 14'' so that the observer is enabled to properly set the poise by bringing his eye into coincidence with the plane passing through the index wire and sighting hair line.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, weighing mechanism including a beam, a poise co-operating with said beam, and reading and sighting indices carried by said poise and adapted to co-operate with said beam.

2. In a device of the class described, in combination, a beam, a poise co-operating with said beam, a glazed opening in said poise, and an index carried by said poise and adapted to co-operate with said beam.

3. In a device of the class described, in combination, a beam, a poise co-operating with said beam, a glazed opening in said poise, and reading and sighting indices carried by said poise.

4. In a device of the class described, in combination, a beam, a poise slidably co-operating with said beam, graduations upon said beam, and reading and sighting indices carried by said poise and adapted to co-operate with said graduated beam.

5. In a device of the class described, in combination, a graduated beam, a poise co-operating with said beam, reading and sighting indices carried by said poise, and means for maintaining said indices in proper relation to said poise.

6. In a device of the class described, in combination, a beam, a poise co-operating with said beam, a glazed opening in said poise, and reading and sighting indices carried by said poise.

7. In a device of the class described, in combination, a beam, a poise co-operating with said beam, an opening in said poise, a transparent member in said opening, and a reading index inscribed upon said transparent member.

8. In a device of the class described, in combination, a beam, a poise co-operating with said beam, an opening in said poise, a transparent member in said opening, and reading and sighting indices inscribed upon said transparent member.

9. In a device of the class described, in combination, a graduated beam, a poise co-operating with said beam, an opening in said poise, a transparent member, and reading and sighting indices carried by said poise and adapted to co-operate with said graduated beam.

10. In a device of the class described, in combination, a graduated beam, a poise co-operating with said beam, a magnifying lens supported by said poise, and reading and sighting indices carried by said poise.

ORWELL C. REEVES.